United States Patent [19]

Perard

[11] 4,129,049

[45] Dec. 12, 1978

[54] POWER JACK INCORPORATING STRESS-RESPONSIVE COMPONENTS

[75] Inventor: Jean-Claude V. Perard, Velizy, France

[73] Assignee: Societe Francaise d'Equipements pour la Navigation Aerienne (S.F.E.N.A.), Velizy-Villacoublay, France

[21] Appl. No.: 765,286

[22] Filed: Feb. 3, 1977

[51] Int. Cl.² ............................................. B64C 13/04
[52] U.S. Cl. ................................. 74/625; 244/83 D
[58] Field of Search ............... 244/83 D, 178, 17.13, 244/196; 64/15 C, 27 C; 74/625

[56] References Cited

U.S. PATENT DOCUMENTS

| | | |
|---|---|---|
| 2,522,284 | 9/1950 | Lecarme ............................ 244/83 G |
| 2,833,496 | 5/1958 | McRuer et al. ........................ 244/196 |
| 2,852,212 | 9/1958 | Mallery et al. .................. 244/196 X |
| 2,881,631 | 4/1959 | Riccius ........................... 244/83 D X |
| 2,923,503 | 2/1960 | Vogel .................................. 244/83 D |

Primary Examiner—James F. Coan
Attorney, Agent, or Firm—Scully, Scott, Murphy & Presser

[57] ABSTRACT

A power jack, particularly adapted to equip the control system of an aerodyne, including stress-responsive components, for example, a helical coil spring, in which indicator instruments record any locking between the relatively movable elements of the jack, such as a rotatable shaft and an encompassing sleeve to thereby disengage a disengaging element and allow the control functions to bypass the jack.

8 Claims, 9 Drawing Figures

Fig.5

POWER JACK INCORPORATING STRESS-RESPONSIVE COMPONENTS

BACKGROUND OF THE INVENTION

1. Field of the Invention

The present invention relates to a jack, and more particularly a power jack which incorporates stress components, and which is adapted to be advantageously, although not exclusively, employed in equipping the flight control system of the usual type of aerodyne, for example, an airplane or a helicopter.

In general, it is known that direct control over such aerodynes is achieved by the action of the pilot on at least one operating lever, such as a control or steering column which is connected to the control devices of the aerodyne through the intermediary of steering apparatus and shafts, as in the instance of a system for varying the twist or pitch of the rotor blades of a helicopter.

This direct control has an accessory back-up provided by an automatic pilot system, or automatic pilot, which acts on a jack allowing for rapid piloting, but which has a limited scope of operation.

Thus, in order to prevent this jack, which is associated with the automatic pilot, from acting on the operating lever, i.e., control column, instead of effectuating the command of the controls it is necessary to provide a device that acts upon the operating lever, and which will exercise a greater counteracting force above the jack of limited operating range, than that of the resistance below the jack which is exerted by the controls.

Within the basic technology such a device may include a tension spring or a compression spring, which will oppose the stress according to a predetermined principle, usually referred to as the "principle of stress," located above the jack, and in which the position of its mounting or anchorage can be varied, for example, by means of a jack, such as a power or stress jack.

This type of jack may include, in the basic technology, a motorized speed reducer, which can, on occasion, be controlled by the automatic pilot, or by the pilot himself, having an externally projecting shaft which responds to a lever (or mounting), on which the spring is articulated.

A shift of the anchoring point of the spring thus permits the position of the operating lever or control column to be readjusted, and the jack may be maintained in a position so as to have the greatest extent of travel (around a zero point), which is important because, as is well known, these jacks have a very limited degree of travel.

One of the advantages of this system, and, particularly when the stress principle is incorporated therein, is that it restores a sensation or feel to the hands of the pilot which allows him to recover a position corresponding to a particular flight pattern.

Finally, it is to be noted that these systems may include, on the one hand, a device for detecting a shift of the external shaft or axis with respect to the anchoring point, and which can, for example, be constituted of a micro contact breaker serving to stop or to minimize the action of the automatic pilot, for example, by blocking the jack, or by limiting its movement, which would otherwise conflict with the action of the pilot when he shifts the operating lever; and, on the other hand, a device for disengaging the anchorage, thus permitting the spring which utilizes the stress principle to be recentered.

2. Discussion of the Prior Art

Currently, all of these functions are performed by modular elements which are connected to each other by mechanical means and which are usually exposed to the open air. As a result, these elements are not reliable, they are difficult to adjust and control, and they age very poorly, particularly in a salty atmosphere. As a result, the life expectancy of such a system frequently barely exceeds fifty hours of service.

Furthermore, these prior art systems are all subject to a serious drawback in that, when the anchorage is disengaged, there occurs a recentering or shifting of the spring so as to cause a serious discontinuity in the operation of the flight control system. This discontinuity quite readily is the cause of dangerous breakdowns and accidents.

SUMMARY OF THE INVENTION

Thus, the present invention has as its principal object the provision of a jack of the described type in which, at the least, the primary functions enumerated above are effectuated by elements which are incorporated within a compact, water-tight system; these functions essentially encompassing principles and components of stress, mobility in the anchorage, detection of a shift in the exterior axis with respect to a point of anchorage, possibly including the motorizing of the anchorage, and a detection of the shift of the anchorage point with reference to a stationary structure which allows for zero stress on the stress components, and maintaining the entire system in position.

The invention has as an object the perfection of the principle of such a jack to thereby overcome dangerous disturbances caused by disengaging the anchorage of the spring used as a stress component, and only allowing for the locking of the exterior shaft or axis in the face of at least two serious and simultaneous breakdowns.

For this reason the inventive jack also includes, incorporated in the compact, water-tight system, a clutch and a damper which serves to overcome the discontinuity produced during the spring anchorage disengagement.

In accordance with another feature of the invention, the jack is rotatable in the same direction of rotation as its outwardly extending axis or shaft, and, as a result, the law or principle of stress is applied due to a spring operating in torsion. This characteristic provides for the following advantages, in effect, ease of installation of the jack, greater precision, and an appreciable reduction in mechanical play or tolerance.

BRIEF DESCRIPTION OF THE DRAWINGS

Reference to preferred embodiments of the invention may now be had by way of the described examples, which are not limiting, and pursuant to the accompanying drawings, in which.

Figure 8:
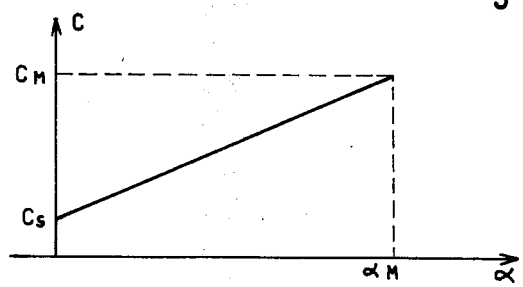
Figure 9:
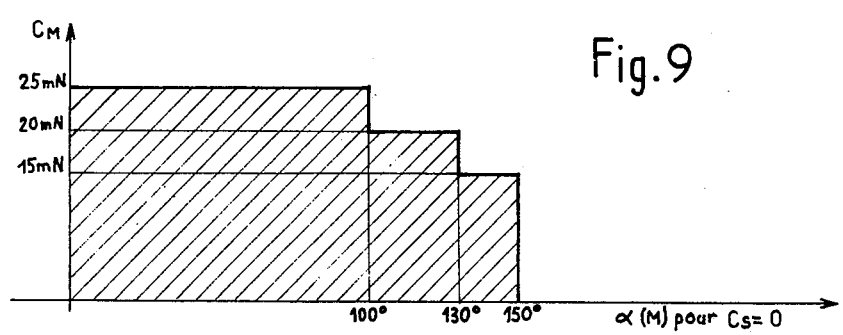

the counteracting torque C as a function of the angle α, when the point of anchorage is positioned on one of the jack reinforcements (FIG. 8);

the maximum counteracting torque CM as a function of maximum clearance α M (FIG. 9).

DETAILED DESCRIPTION

It will be evident that the embodiments described herein are specifically adapted at equipping the piloting system of an aerodyne, such as an airplane or a helicopter. It is to be understood, of course, that the jack of the invention could be applicable, in a general manner, to all command systems which use a system similar to that of the piloting system of an aerodyne.

Figure 1:
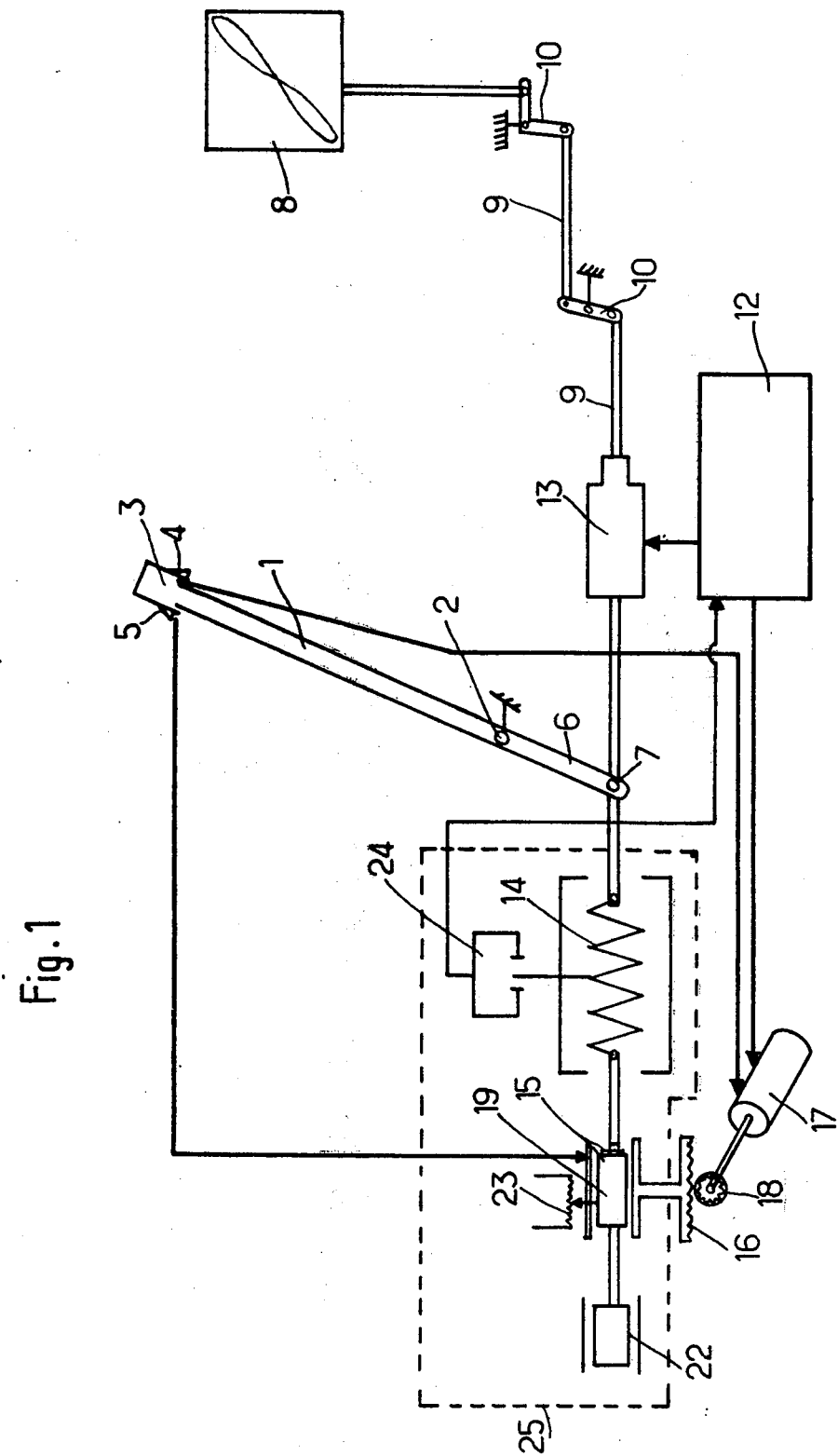
FIG. 1 is a schematic diagram illustrative of the principle of operation of the jack according to the invention.

With reference to FIG. 1, the piloting system includes an operating lever 1, or control column, pivotally mounted for movement around an axis 2 which is integral with the fixed structure of the aerodyne. The free end of the upper arm of the lever 1 is provided with a handle 3, which may incorporate many control devices, only two of which, components 4 and 5, will be mentioned in the following description.

The free end of lower arm 6 of lever 1 is adapted to execute, by means of a pivot joint 7, command over control devices 8, through the intermediary of a steering device 9 and shafts 10.

This pilot system is operated by an automatic pilot 12, acting on a jack 13, which is rapid in operation but has limited action, and which is mounted on steering device 9. Thus, the jack is movable with respect to the fixed structure or frame of the airplane, and is supported, with the aid of steering device 9, on the end of lower arm 6 of operating lever 1.

Thus, in order to prevent the action of jack 13 from causing pivoting of operating lever 1 instead of acting on control devices 8, a device must be provided for opposing the action of jack 13 above the latter, a counteracting resistance greater than that exerted on jack 13 below the latter by the array of control devices 8 and steering device 9.

In order to obtain this result, an element of elasticity is used, generally referred to as a stress component and consisting, in the example shown, of a precompressed or pretensioned spring located opposite the steering device 9 with reference to the axis of pivot joint 7, and which is connected at one of the ends thereof to arm 6 of lever 1.

The other end of spring 14 is connected to a movable anchorage point 15 which can be shifted longitudinally with the aid of a rack 16 and a reduction motor 17, having a projecting shaft mounting a pinion 18 which interengages with the rack 16.

It should be noted that the anchorage proper is effected by prestressing spring 14. Without such prestressing, a shifting of the operating lever 1 would be produced up to the stress limit of the spring, in effect, greater than the stress found by jack 13.

The connection between anchorage 15 of spring 14 and rack 16 is adapted to be disengaged, i.e., clutch 19, so that spring 14 can be recentered while in the disengaged position.

In order to prevent the rough discontinuity which is generated upon disengaging anchorage 15, the anchorage is connected to a damping system 22.

The reduction motor 17 can be operated either manually, with the aid of a switch 4 situated in the handle 3 of operating lever 1, or by the automatic pilot 12. In this regard, control over the position of anchorage 15 can be attained by means of a potentiometer 23.

Finally, it is to be noted that any shifting of the exterior axis or shaft with respect to anchorage 15 is detected by a microswitch 24 operatively connected to automatic pilot 12, in order to minimize the action of jack 13 when the pilot shifts operating lever 1.

The various elements described hereinabove permit the fulfillment of the different functions described in the introduction of this description and will not, therefore, be explained again.

However, it is to be considered that one of the essential objects of the invention is the provision of a jack, formed of one piece, water-tight and with minimum play, in which the principal elements are combined with stress components, particularly the elements included within the phantom line 25, among which there is the inventive combination of the clutch 19 and the damper system 22 with the system incorporating components employing principles of stress.

In order to attain this result, the invention offers an essentially rotatable jack in which the stress principle is effected due to elastic means working by torsion, for example, a torsion spring which, consequently, considerably facilitates its rapid assembly and allows for achievement of greater precision and security.

In this case, shifting of the anchorage is achieved by rotation relative to the point of anchorage, and no longer by translation as in the prior art. This unique characteristic or feature is especially advantageous since it permits the jack to be composed of only rotary elements of considerable structural precision and operational reliability, and which may be easily introduced into a small, water-tight receptacle or housing.

Figure 2:
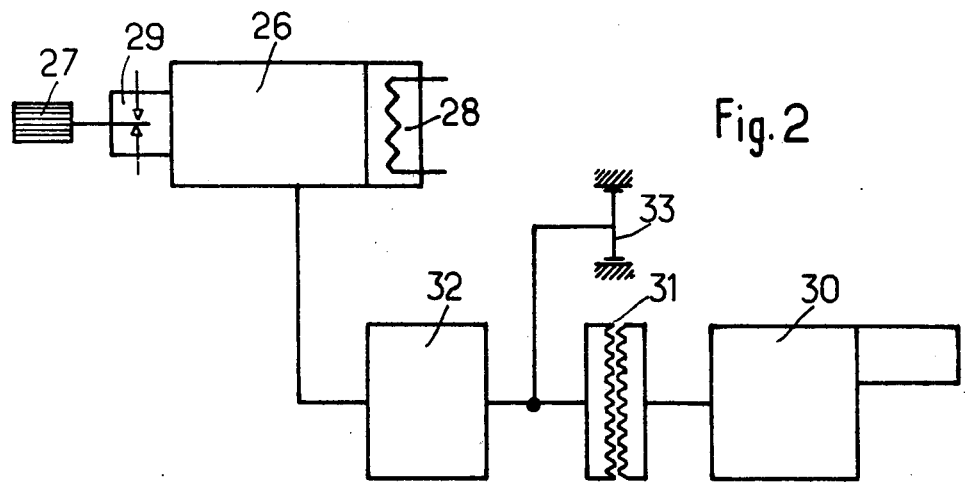
FIGS. 2, 3 and 4 are schematic views of, respectively, three embodiments of the jack shown in FIG. 1.

With reference to FIG. 2 illustrating a schematic view of a rotary jack, which carries out all of the previously mentioned functions, this jack is composed essentially of a stress component 26 having a rotatable anchorage, which is joined to a rotatable exterior shaft or axle 27. This system is equipped with an anchorage potentiometer which allows for detection of shifting of the point of anchorage with respect to the fixed airplane structure, and a microswitch 29 for detecting the rotational movements of the exterior axis with respect to the point of anchorage.

Rotation of the anchorage is achieved by means of a reduction motor 30 whose outwardly extending shaft is connected to a clutch 31 which is joined, on the one hand, to a reducer 32 driving the anchorage and, on the other hand, to a damping device 33 which is activated when the motor reducer is in the disengaged position.

Of course, in order to obtain the desired action of the rotary jack as described above on operating lever 1, it is possible to equip the rotatable outwardly extending axle 27 or shaft of this jack with a block on which there is articulated a rod, and which, in turn, is articulated to lever 1.

Occasionally it is possible to join the extending shaft of the jack directly to the pivotal axis 2, provided that the latter is integral with the operating lever 1.

As previously mentioned, the rotary jack allows for the attainment of the following functions:

application of stress or strain principle;
mobility of the anchorage;
motorization of the anchorage with a clutch;
damping in the disengaged position of motorization;
detection of shifting of the extending axis or shaft with respect to the point of anchorage, and
detection of shifting of the point of anchorage with respect to the fixed airplane structure.

It should be noted, however, that the invention is not limited to a jack which accomplishes all of these functions. It also relates to simplified versions of this stress jack, such as those shown, for example, in FIGS. 3 and 4.

Figure 3:
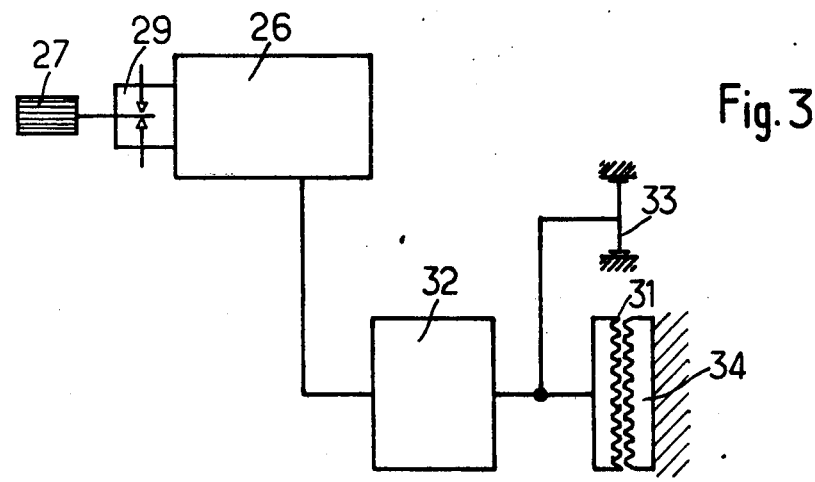

The rotary jack shown in FIG. 3 differs from the one shown in FIG. 2 only in that the potentiometer 28 and the reduction motor 30 have been eliminated. In this embodiment, plate 34 of clutch 31 (which was connected to the reduction motor 30 in the example shown in FIG. 2) is stationary.

Figure 4:
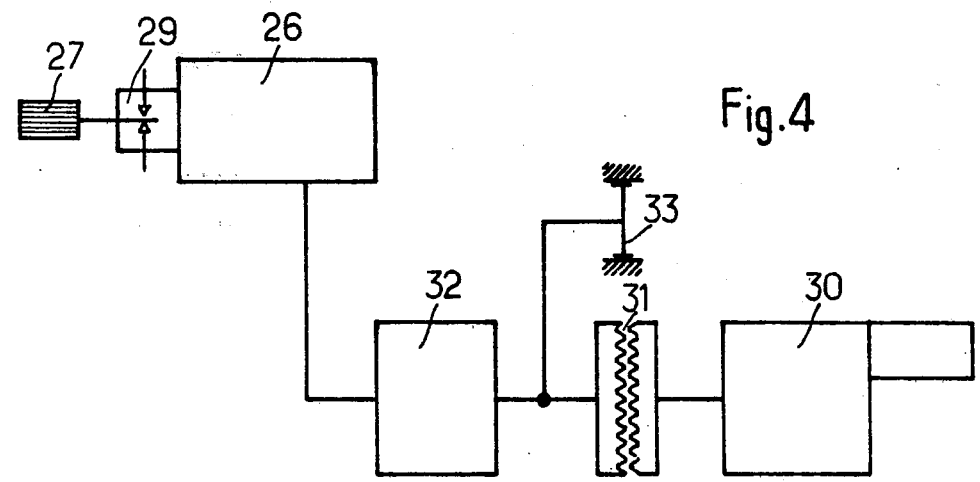

According to the embodiment shown in FIG. 4, the rotary or rotatable jack includes all of the elements in the jack shown schematically in FIG. 2, except the anchorage potentiometer 28, which has been eliminated.

Figure 5:
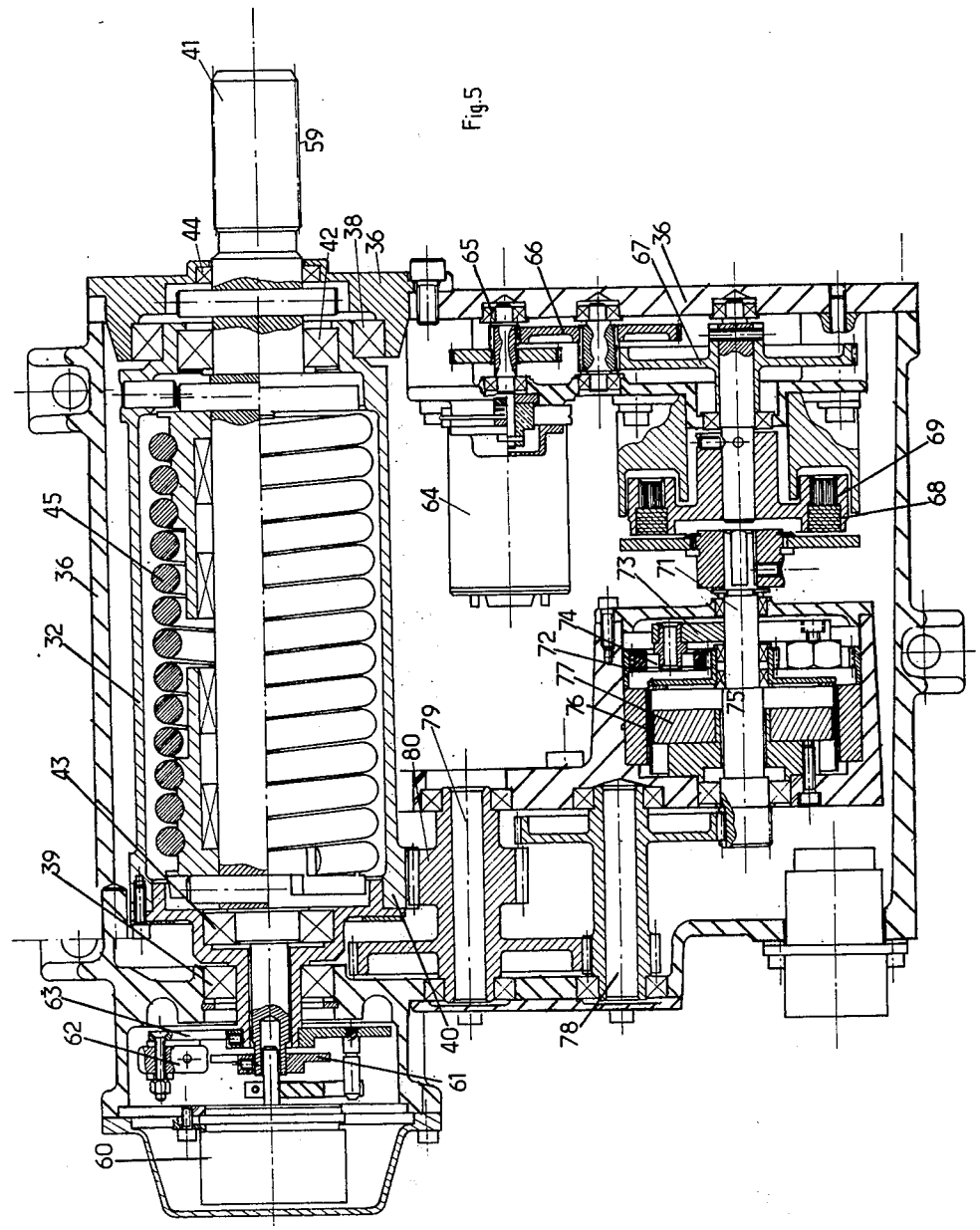
FIG. 5 is a longitudinal sectional view of a rotary jack with incorporated stress components according to the principle shown in FIG. 2.
Figure 6:
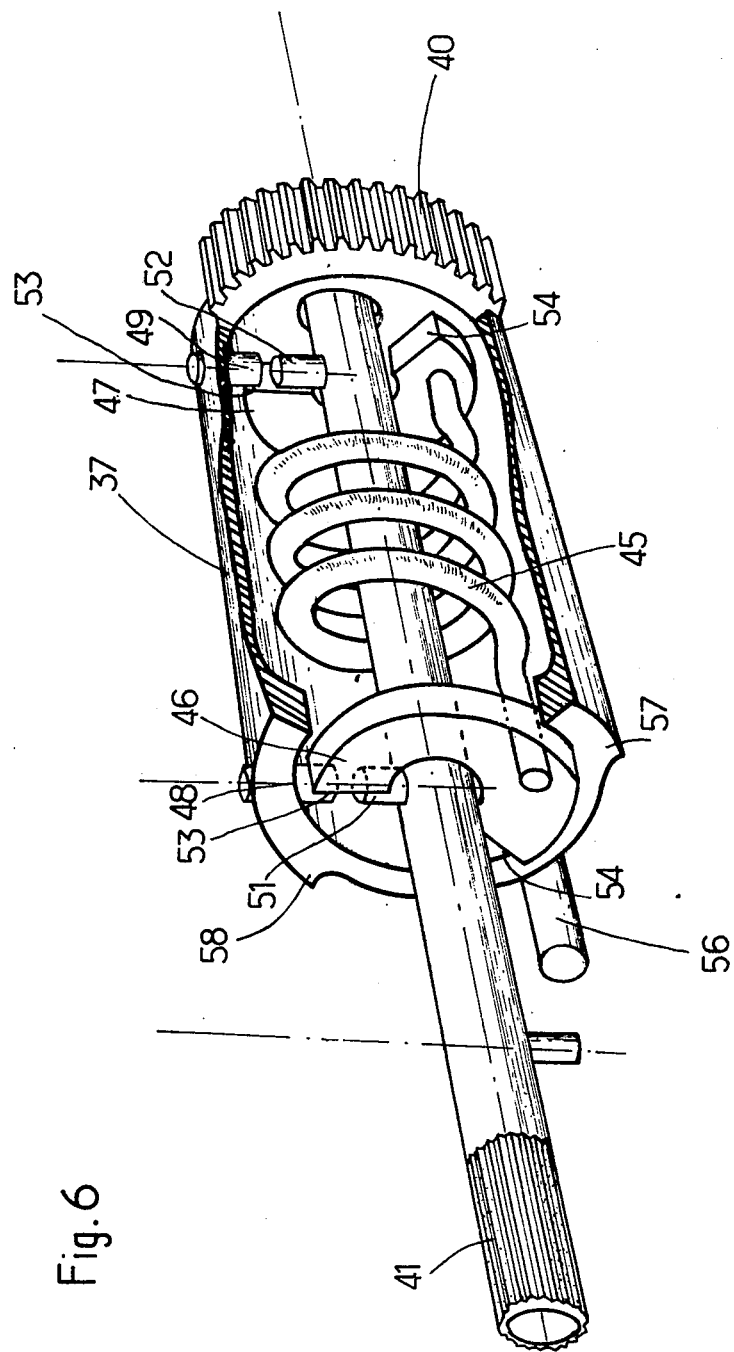
FIG. 6 is a perspective view, partly in section, of the stress components used in the jack shown in FIG. 5.

FIG. 5 shows a rotatable jack in which all of the schematically represented elements of FIG. 2, as well as their mechanical connections, are located within a water-tight housing 36. In this jack, the stress component is constituted of a rotational system, shown schematically, in perspective, in FIG. 6, which essentially includes:

(1) a tubular sleeve 37, rotatably mounted interiorly of housing 36, by means of ball bearings 38 and 39, and which includes, at one end, a cogged ring gear employed to drive the sleeve;

(2) an outwardly projecting shaft 41 coaxially extending within sleeve 37, and rotatably mounted, at one end, to sleeve 37 by means of ball bearings 42, 43 and, at the other end, in water-tight relationship, to housing 36, from which it extends, by means of ball bearing 44; and (3) a helical spring 45, located in the space intermediate the projecting shaft 41 and sleeve 37, which is one, at each end, fastened to a plate in the shape of a circular sector 46, 47, the spring being coaxial with projecting shaft 41 and adapted to pivot thereabout.

The mechanical connections between sleeve 37, spring 45, and projecting shaft 41 are effected, at one end, by two shoulders 48, 49 which are formed integrally with sleeve 37, and by two pins 51, 52 which are fixedly fastened to the projecting shaft 41.

The two shoulders 48, 49 are located, respectively, at the generatrix of sleeve 37 and the two respective planes of circular sectors 46, 47, so that each of these shoulders 48, 49 can come into contact with the radial surfaces 53 and 54 of the circular sector that corresponds therewith.

In a similar manner, the two pins 51 and 52 are located on one generatrix of shaft 41 and in the respective planes of the two circular sectors 46 and 47.

In the same way, the two pins 51 and 52 can thus come into contact with radial surfaces 53, 54 of the corresponding circular sectors 46 and 47.

It should be noted that, when at rest, i.e., in the absence of any torque acting on projecting shaft 41, the spring is subjected to a prestressing force so that each of circular sectors 46, 47 abuts one of its radial surfaces 53, 54 against the pin 51, 52 and the shoulder 48, 49 that corresponds therewith.

Thus, each rotation of sleeve 37, in either direction, imparts a corresponding rotation to shaft 41, providing that the opposing torque applied to the shaft is no greater than the torque of the prestressing force on spring 45. Thus, there is obtained a shifting of the anchorage of spring 45, which is analogous to the one described with regard to FIG. 1.

Moreover, whatever the fixed position of sleeve 37, projecting shaft 41 will be able to rotate in either direction, while opposing any torque greater than the prestress torque exerted on shaft 41.

The angular clearance of the stress component, that is the maximum pivot of projecting shaft 41 for a given anchorage position, is equal to the angle formed by the two radial surfaces 53, 54 of the circular sectors. In the example shown, this angle has a value of 100°.

Moreover, rotation of the anchorage can be limited by means of an abutment 56 which can come into contact, from one side thereof or the other, with two protrusions 57 and 58 located on the outer surface of sleeve 37. In the example shown, the angular clearance of the anchorage can reach approximately 120°.

Projecting shaft 41 is fluted on its extreme end part relative to the housing so as to be able to accommodate a mounting which is directly connected to the steering device of the flight control.

This projecting shaft moves the indicator of a rotary potentiometer 60 which is located within housing 36, from the side opposite the grooved or fluted end 59.

Moreover, slightly above potentiometer 60, shaft extension 41 is integral with a cam 61 on which there rests a roller carried by an actuating rod of microswitch 62. The microswitch 62 is, in turn, carried by a disk 63 which is integral with sleeve 37. This microswitch 62 allows for the detection of relative rotations between sleeve 37 and shaft 41.

Driving of the sleeve 37 is accomplished by means of a disengageable motor device with a damper, and which includes a servomotor 64 followed by a reducer (pinions 65, 66 and 67). This reducer moves drive disk 68 of an electromagnetic disk clutch which functions in such a way that, when reel 69 is fed (or, to the contrary, when it is not fed) the drive disk 68 and the driven disk 70 are operatively joined together.

The axle or shaft 71 of the driven disk 70 involves the following components:

At one end thereof, for example, by means of satellite pinions 72 mounted on disk 73 which is fastened to shaft 71, that engage respectively a stationary cogged ring gear 74 and a pinion 75 rotatably mounted on shaft 71, which moves the rotor 76 of a classic Foucault current damper whose magnetic field is generated by a permanent magnet 77, (it should be noted that rotor 76 could be moved by means of spur pinions) and; at the other end, a reducer system composed of gear trains 78 and 79, having an escarpment pinion 80 engaging ring gear 40 of sleeve 37.

It should be noted that, in the engaged position, the anchorage point (position of the sleeve 37) is reversible due to a torque greater than 30 mN being applied to the outwardly extending shaft.

Figure 7:
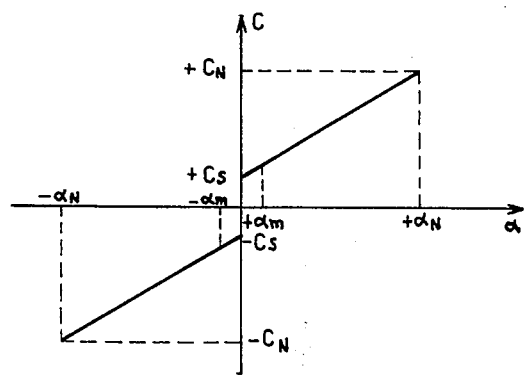
FIGS. 7, 8 and 9 are, respectively, graphs illustrative of the counteracting torque C exerted by the stress components as a function of angle positions α of the exterior shaft of the jack with reference to the point of anchorage (FIG. 7)

As for the application of stress, due to the fact that it is provided by a torsion spring, its characteristic $C(\alpha)$ (opposing torque C as a function of the angle $\alpha$ of the outwardly extending shaft) is of the type shown in the graphs of FIGS. 7 and 8.

When the point of anchorage is situated in the center of mechanical reinforcements or shoulders (FIG. 7), the curve is symmetrical with respect to the center of the coordinates and includes a portion in which torque C increases (or decreases) due to an angle α zero, up to a threshold $C_s$ which is the torque threshold of prestressed spring 45. The curve then includes two linear portions of the configuration $C = k\alpha \pm C_s$ which extend, respectively, to the points $(C_N \alpha_N)$ and $(-C_N -\alpha_N)$, $\alpha_N$ being the maximum clearance and $C_N$ the maximum torque. The locus $\alpha_m$ of the operative change of state of the microswitch is plotted on this curve. It should be noted that this microswitch can be arranged so that this operative change of state occurs when the pilot shifts the operating lever approximately from 1 to 6 percent.

In the case illustrated in FIG. 8, where the point of anchorage is positioned on one of the mechanical shoulders or reinforcements, the maximum clearance $\alpha_M$ then becomes equal to $2\alpha_n$ whereas the maximum torque $C_M$ is equal to $(2 C_N - C_s)$.

FIG. 9 is a graphical illustration of the $C(\alpha)$ characteristics that are possible under the hypothesis that the threshold $C_s$ is null.

This illustration shows that three characteristics of the stress characteristics correspond to optimal utilization of performance. It deals with the concept that:

25 mN — 100°: Gradient 0.25 mN/d°
20 mN — 130°: Gradient 0.15 mN/d°
15 mN — 150°: Gradient 0.1 mN/d°

It should be noted in this regard, that, in the case of a threshold $C_s$ that is not zero, the maximum clearance $\alpha_M$ should be decreased to a value corresponding to the threshold adopted.

Finally, with regard to the safety of the jack shown in FIG. 5, in the hypothetical case of the locking of sleeve 37 to the projecting shaft 41, for example, in the event that one of the ball bearings becomes jammed, the pilot would be able to continue flying by disengaging the motor of the jack.

Similarly, in the event that the anchorage locked, for example, because of the locking of a ball bearing 38 or of one of the various gears, the pilot can continue to fly within the limit of clearance of the projecting shaft while opposing the action of the spring.

What is claimed is:

1. A rotatable jack, including a stress means, for a control system for an aerodyne, comprising:
   (a) a stress means having a rotatable anchorage and including a tubular sleeve rotatably mounted relative to a stationary structure; an outwardly projecting shaft coaxially extending within said sleeve and rotatably mounted relative to said sleeve; a helical coil spring located in the space intermediate said projecting shaft and said tubular sleeve, said spring being coupled at each end to a plate which is rotatable relative to said projecting shaft; two radial shoulders fixedly coupled to said sleeve, and two pins fixedly coupled to the outwardly projecting shaft, with said shoulders and said pins being arranged so that each of said plates can come into contact and drive or be driven by a corresponding shoulder or pin; and
   (b) means for rotatably driving said sleeve including a motor having its shaft coupled to the guiding element of a disengaging means, said guiding element being connected to said tubular sleeve by a transmission including a brake means.

2. A rotatable jack according to claim 1, in which said plates are pivotable about said outwardly projecting shaft and are in the form of circular sectors.

3. A rotatable jack according to claim 1, in which said tubular sleeve is coupled to a cogged ring gear.

4. A rotatable jack according to claim 1, in which said projecting shaft drives the indicator of a rotatable potentiometer.

5. A rotatable jack according to claim 1, which includes a microswitch mounted between said outwardly projecting shaft and said tubular sleeve.

6. A rotatable jack according to claim 1, in which said disengaging means includes an electromagnetic disk clutch.

7. A rotatable jack according to claim 1, in which said brake includes a Foucault current brake.

8. A rotatable jack according to claim 1, including a driving means for said sleeve including a motorized reducer connected to said disengaging means, said disengaging means including a Foucault current brake and a second reducer, the escape pinion of which engages the ring gear of said sleeve.

* * * * *